United States Patent
Plona et al.

(10) Patent No.: US 6,799,416 B2
(45) Date of Patent: Oct. 5, 2004

(54) DEVICE FOR SUPPORTING AND RECENTERING THE SHAFT OF A TURBOJET FAN AFTER UNCOUPLING

(75) Inventors: Daniel Plona, Vulaines sur Seine (FR); Patrick Morel, Chartrettes (FR)

(73) Assignee: SNECMA Moteurs, Paris (FR)

( * ) Notice: Subject to any disclaimer, the term of this patent is extended or adjusted under 35 U.S.C. 154(b) by 46 days.

(21) Appl. No.: 10/387,392

(22) Filed: Mar. 14, 2003

(65) Prior Publication Data

US 2003/0182926 A1 Oct. 2, 2003

(30) Foreign Application Priority Data

Mar. 14, 2002 (FR) .............................. 02 03151

(51) Int. Cl.$^7$ ................................ F02K 3/06
(52) U.S. Cl. ..................... 60/223; 60/226.1; 415/9; 416/2
(58) Field of Search .................. 60/226.1, 223; 415/9; 416/2

(56) References Cited

U.S. PATENT DOCUMENTS

| | | | |
|---|---|---|---|
| 3,476,454 A | * 11/1969 | Markey | 384/446 |
| 4,569,070 A | * 2/1986 | Schubert et al. | 378/132 |
| 6,082,959 A | * 7/2000 | Van Duyn | 415/9 |
| 6,402,469 B1 | * 6/2002 | Kastl et al. | 416/2 |
| 6,491,497 B1 | * 12/2002 | Allmon et al. | 416/174 |

FOREIGN PATENT DOCUMENTS

| | | |
|---|---|---|
| EP | 0 874 137 A2 | 10/1998 |
| EP | 1 022 438 A2 | 7/2000 |
| FR | 2 452 034 | 10/1980 |
| FR | 2 485 631 | 12/1981 |
| GB | 1 556 266 | 11/1979 |

* cited by examiner

Primary Examiner—Ted Kim
(74) Attorney, Agent, or Firm—Oblon, Spivak, McClelland, Maier & Neustadt, P.C.

(57) ABSTRACT

The invention provides a device for supporting and recentering a shaft (2) after decoupling. The device comprises an annular support (4) surrounding the shaft (2), a bearing (5) secured to the annular support (4) and having an inner ring (9) which is spaced apart from the shaft by clearance J. The inner ring (9) has two webs or tenons (14a, 14b) that are normally held to the periphery of two troughs (16a, 16b) carried by the shaft (2). Two sets of balls (28a, 28b) normally bear against the bottoms of indentations (25, 26) formed facing one another in the adjacent radial walls of the troughs (16a, 16b) and of the inner ring (9). Resilient means (26) tend to urge the troughs (16a and 16b) towards each other. In the event of the webs or tenons (14a, 14b) breaking due to a large unbalance, the balls (28a, 28b) roll on the walls of the indentations (25, 26) and move the troughs (16a, 16b) apart from each other. The resilient mans (20) tend to bring the balls (28a, 28b) back towards the bottoms of the indentations and to recenter the shaft (2) relative to the inner ring (9).

3 Claims, 4 Drawing Sheets

DEVICE FOR SUPPORTING AND RECENTERING THE SHAFT OF A TURBOJET FAN AFTER UNCOUPLING

The invention relates to the problem of turbojet integrity following a fan failure.

Turbojets comprise an engine which drives a large diameter fan placed in front of the engine. The blades of the fan can become damaged following ingestion of a foreign body. In general, the fan is sufficiently robust to withstand the effects of ingesting such foreign bodies without too much damage, and it is capable of continuing to operate, perhaps at reduced efficiency.

Nevertheless, in some circumstances, the fan can be damaged to such an extent that it loses pieces of one or more blades. This gives rise to a large amount of unbalance which requires the engine to be turned off in order to reduce risks for the aircraft. Nevertheless, this unbalance created by losing blades gives rise to cyclical loading that is extremely large and that must be absorbed by the structure, at least while the engine is slowing down to the windmilling speed of the fan. The windmilling speed is the speed at which the engine rotates in its non-operating state as a result of the speed with which it is traveling through the atmosphere.

One usual way of eliminating the cyclical loading that needs to be absorbed by the structure consists in decoupling the rotary shaft of the fan from the support structure at the front bearing of the shaft. This is usually achieved by interposing fusible elements between the bearing and the bearing support structure, which elements break whenever the radial forces that the bearing needs to withstand exceed a predetermined value.

The fan shaft is then free to move radially to some extent and to turn about the longitudinal axis of symmetry of the engine, and the fan can start turning about an axis of rotation that passes substantially in the vicinity of its new center of gravity.

Nevertheless, under certain circumstances, the vibration that results from the unbalance which persists even at windmilling speed can still be very large. This is due to the natural frequency of vibration of the fan and to the loss of radial stiffness from the support bearing. Thus, in certain shaft support arrangements, means are provided for conserving a degree of stiffness for the bearing, or even for returning the axis of the shaft substantially onto the axis of the engine.

EP 0 874 137 provides for interposing a support element between the outer ring of the bearing and the support structure, which support element is normally held stationary by radially fusible elements and can slide in an annular cavity after the fusible elements have broken. The element then comes to bear against a damper which tends to return it towards its initial position. The annular cavity is in the form of a hollow cap defined by two concentric spherical walls against which the surfaces of the support element rub, thereby leading to inaccuracy in recentering.

U.S. Pat. No. 6,009,701 also describes a bearing for supporting a fan shaft in which the outer ring is secured to a stationary structure by radially fusible elements for the purpose of releasing the shaft relative to the stationary structure in the event of the fusible elements breaking. The outer ring is surrounded by a helically-shaped open ring which is capable of co-operating with a conical wall secured to the stationary structure. The conical wall presents a helical inner groove which enables the helical ring to move from one extreme position in which the clearance available to the shaft is at a maximum, towards the other extreme position in which the axis of the shaft again lies on the axis of the engine, as a result of the shaft rotating about the axis of the engine while the speed of the fan is slowing down from its operating speed to its windmilling speed.

The state of the art is also illustrated by U.S. Pat. No. 5,733,050 and U.S. Pat. No. 6,098,399.

In all those documents, it should be observed that the fusible elements are interposed between the outer ring of the bearing and the stationary structure of the engine. After the fusible elements have broken, the bearing is off-center relative to the axis of the engine. Unfortunately, the front bearing of the fan is fed with oil by nozzles secured to the stationary structure. Those nozzles can be damaged during the axial displacement of the bearing and this is mentioned expressly in U.S. Pat. No. 5,733,050. This can lead to the bearing being damaged during windmilling for lack of lubrication, should windmilling continue over a very long period.

The first object of the invention is to provide accurate recentering of the shaft after decoupling.

The second object of the invention is to conserve the integrity of the lubrication means after decoupling.

The invention thus relates to a device for radially supporting the front of a drive shaft for a fan of a turbojet of longitudinal axis X, the axis of said shaft normally coinciding with said longitudinal axis X, the device comprising a stationary annular support surrounding said shaft, a support bearing disposed between said shaft and said support and presenting an outer ring that is stationary in rotation and an inner ring that moves in rotation with said shaft, fusible means interposed radially between one of said rings and the adjacent part of the assembly constituted by said shaft and said support and designed to break on the appearance of a radial force of magnitude greater than a predetermined threshold so as to release said shaft radially relative to said support, and means for recentering the axis of the shaft on the longitudinal axis of the turbojet after said fusible means have broken.

The device is characterized by the fact that the radially fusible means comprise two sectorized annular webs or tenons provided in the respective radially outer regions of the inner ring and extending axially outwards therefrom, the ends of said webs or tenons being normally retained in the peripheries of two annular troughs that are axially spaced apart and constrained to rotate with the shaft, the radially inside face of the inner ring being radially spaced apart from the shaft so as to leave the shaft with clearance in the event of said webs or tenons breaking, and by the fact that the means for recentering the axis of the shaft on the longitudinal axis of said turbojet comprise two sets of balls each disposed between an axial face of the inner ring and the adjacent trough, each ball normally bearing against the bottoms of two facing indentations, one indentation in the adjacent trough and the other indentation in the adjacent front face of the inner ring, and resilient means urging said trough towards each other in order to return the balls towards the bottoms of said indentations.

Thus, in normal operation, when the radial loading applied to the bearing is of a magnitude below the predetermined threshold, the inner ring is secured to the troughs, and the balls are positioned in the bottoms of the indentations. When, following a failure of the fan, unbalance generates radial loading of a magnitude that is not less than the predetermined threshold, the webs or tenons of the inner ring break, and the shaft can move relative to the axis of the turbojet which coincides with the axis of the inner ring. The balls move up the slopes of the troughs and moves the troughs apart, thereby increasing the forces exerted by the resilient means until the rotor is rebalanced. Since the radial force decreases with decreasing speed of rotation, the shaft is recentered by the balls with very little friction force. During the period in which the troughs are off-center relative to the inner ring, the balls roll on the walls of the two indentations that face each other about the centers of the troughs, with friction force that is very low.

The device of the invention thus makes it possible to limit secondary damage to the engine and to the structure of the aircraft during the windmilling stage that follows decoupling. It should also be observed that the free radial displacement of the shaft is limited by contact between the shaft and the inner ring.

Most advantageously, each indentation is circularly symmetrical about an axis that is normally parallel to the longitudinal axis X.

Preferably, the resilient means bear against the axially outer face of one of the troughs, the other trough being axially stationary relative to the shaft.

Other advantages and characteristics of the invention appear on reading the following description given by way of example and made with reference to the accompanying drawings, in which.

Figure 3A:
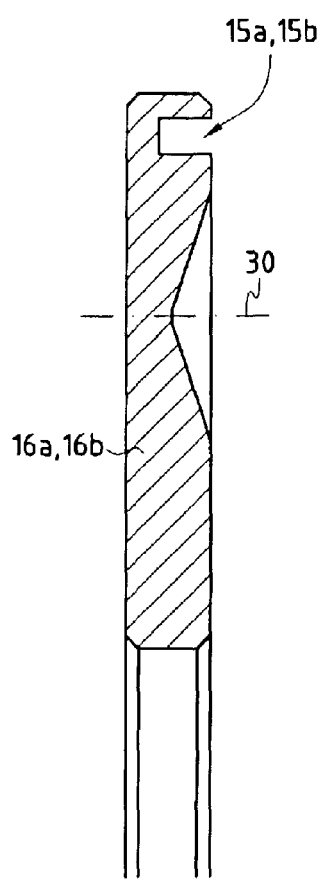
Figure 3B:
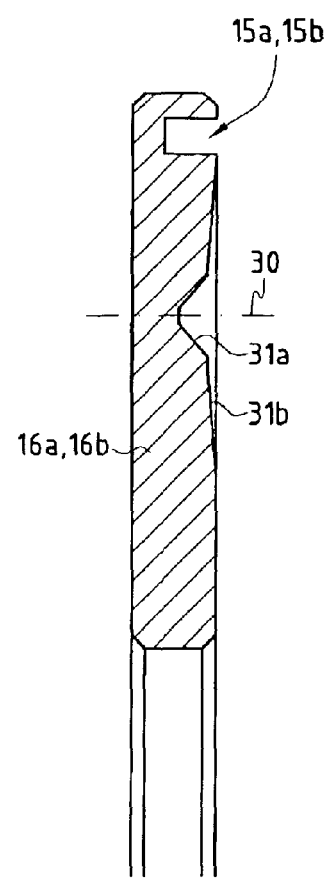
Figure 3C:
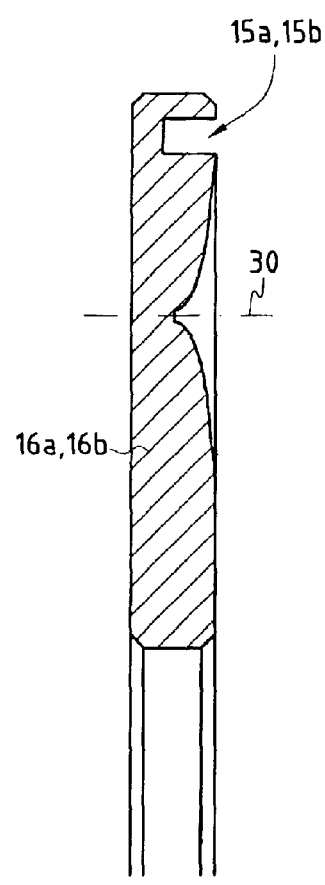
Figure 4A:
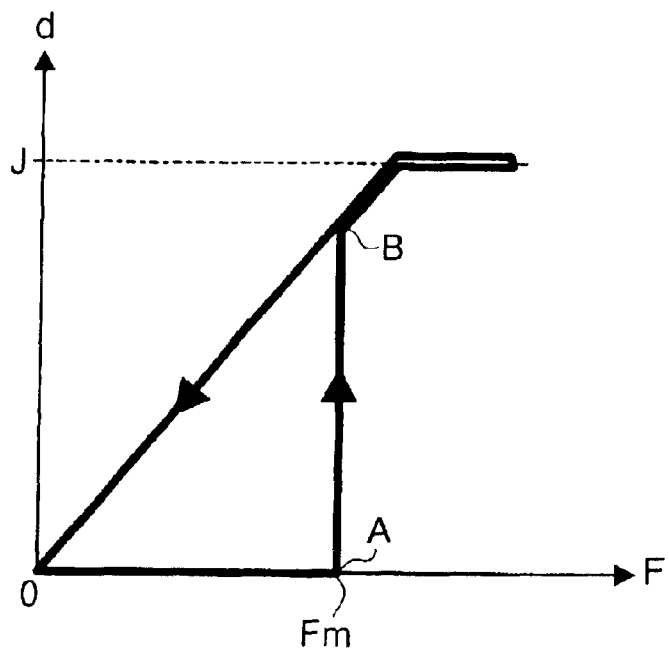
Figure 4B:
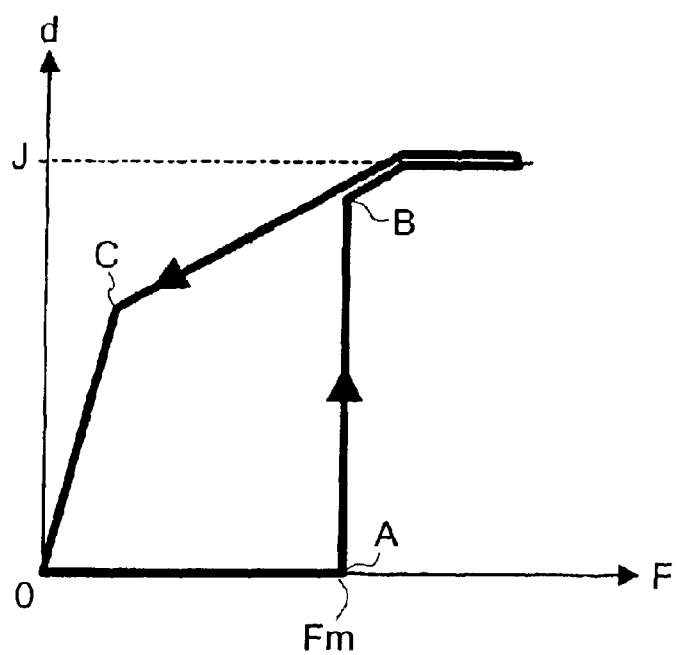

FIGS. 3A, 3B, and 3C are sections through three examples of troughs on an axial plane containing the center of an indentation;

FIG. 4A is a diagram showing displacement of the shaft as a function of radial force for conical indentations as shown in FIG. 3A; and FIG. 4B is a diagram showing the displacement of the shaft as a function of radial force for indentations having the shape shown in FIG. 3B.

Figure 1:
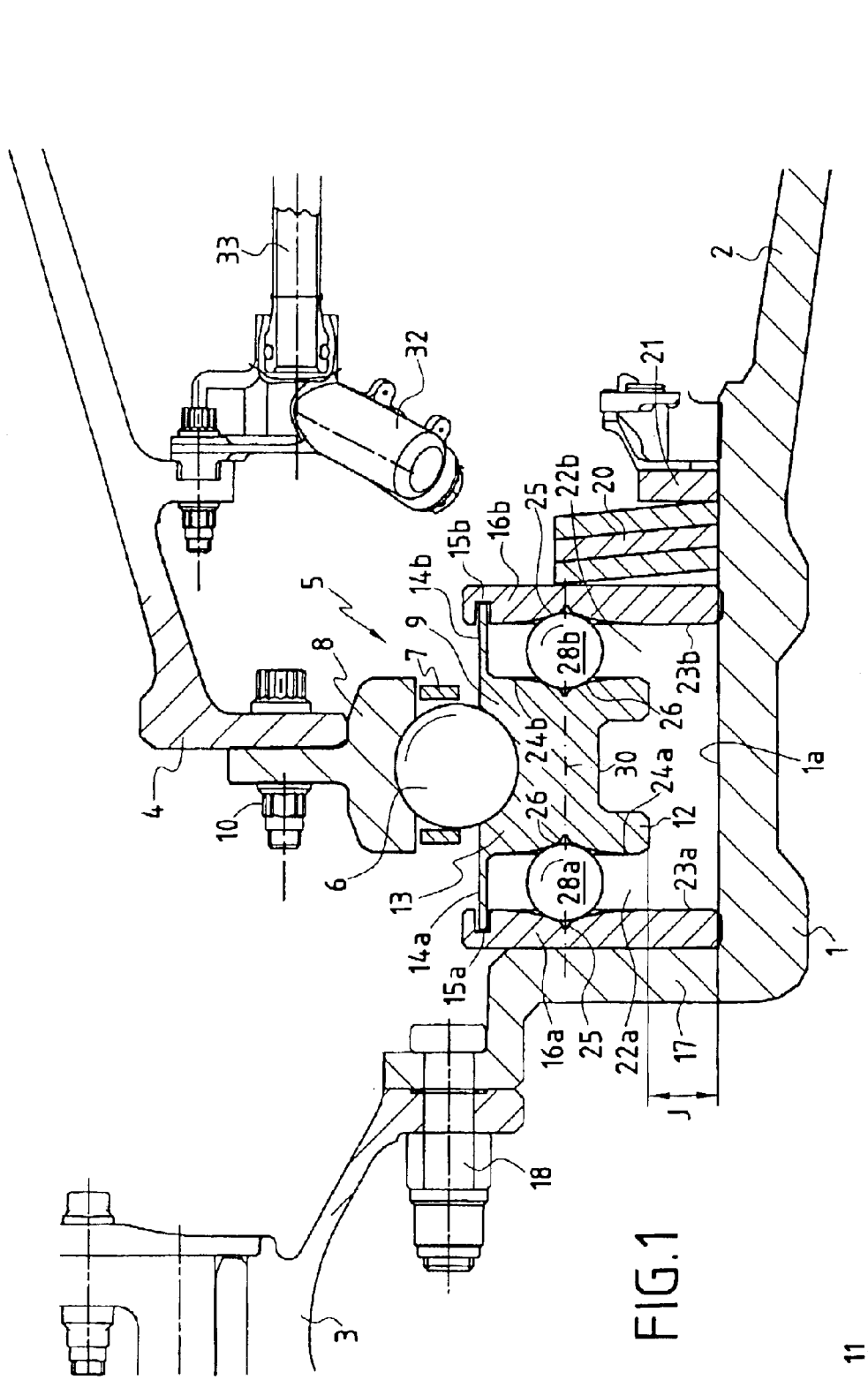
FIG. 1 is a general view of the invention while operating in normal mode.

FIG. 1 shows the front portion 1 of a drive shaft 2 for the hub 3 of a fan of a turbojet having a longitudinal axis X. The shaft 2 is rotated by a low pressure turbine that is not shown in the drawing.

The front portion 1 is supported radially by a stationary annular support 4 of the structure of the turbojet by means of a bearing 5 which has balls 6 positioned in the cavities of a cage 7 interposed between an outer ring 8 and an inner ring 9.

The stationary annular support 4 disposed coaxially about the longitudinal axis X surrounds the front portion 1 of the shaft 2, and the outer ring 8 is secured to the annular support 4 by means of nuts and bolts 10.

Under normal operating conditions, the axis 11 of the shaft 2 coincides with the longitudinal axis X of the turbojet.

As can be seen clearly in FIG. 1, the radially inside face 12 of the inner ring 9 is spaced apart from the outside face 1a of the shaft 2 by a distance or clearance J, and the radially outer region 13 of the inner ring 9 has two annular webs or tenons 14a and 14b which extend axially away from the inner ring 9, the web 14a extending towards the front of the turbojet and the web 14b extending towards the rear.

The front end of the web or tenon 14a is retained in a groove 15a formed at the periphery of a first annular trough 16a constrained to rotate with the shaft 2 and having a front face bearing against the end flange 17 of the front portion 1 of the shaft 2 onto which the hub 3 of the fan is secured by nuts and bolts 18.

In like manner, the rear end of the web 14b is retained in a groove 15b formed at the periphery of a second annular trough 16b constrained to rotate with the shaft 2.

Resilient spacers 20 are interposed between the rear face of the second trough 16b and an annular abutment 21 about the axis 11 which surrounds the shaft 2 and is prevented from moving axially relative thereto. The resilient spacers 20 continuously urge the second trough 16b towards the first trough 16a which is prevented from moving axially relative to the shaft 2. In contrast the second trough 16b is mounted on the shaft 2 in such a manner as to be able to move axially.

The axial length of the webs or tenons 14a and 14b is such that annular gaps 22a and 22b respectively separate the rear face 23a of the first trough 16a from the front face 24a of the inner ring 9, and the rear face 24b of the inner ring 9 from the front face 23b of the second trough 16b.

The rear face 23a of the first trough 16a and the front face 24a of the inner ring 9 both present a plurality of circularly symmetrical indentations about respective axes 30 parallel to the longitudinal axis X, these indentations being referenced 25 in the first trough 16a and 26 in the inner ring 9, and under normal operating conditions these indentations face one another in pairs, as shown in FIG. 1.

Each pair of indentations 25 and 26 houses a ball 28a which, under normal operating conditions, is centered on the common axis 30 of the two indentations 25 and 26 and bears against the bottoms of said two indentations 25 and 26.

The rear face 24b of the inner ring 9 and the front face 23b of the second trough 16b likewise carry respective pluralities of indentations 25 and 26 on axes 30 that retain balls 28b bearing against the bottoms of said troughs.

The diameters of the balls 28a and 28b is a function of the length of the webs or tenons 14a and 14b and is determined in such a manner that under normal operating conditions of the turbojet, the balls 28a and 28b remain in their respective indentations and the ends of the webs or tenons 14a and 14b are retained in the grooves 15a and 15b of the troughs 16a and 16b.

Figure 2:
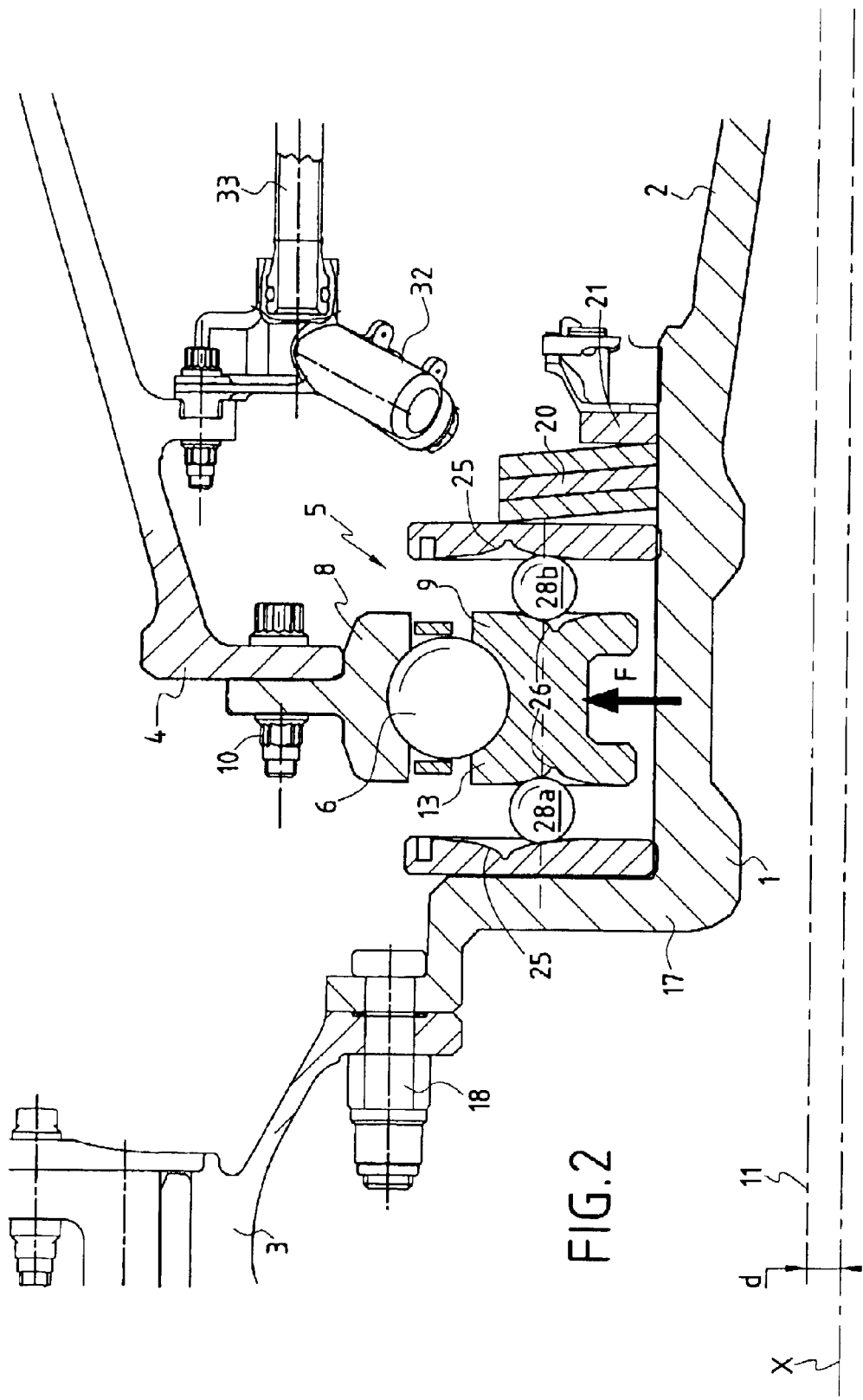
FIG. 2 is a view similar to FIG. 1 showing the device after decoupling.

The webs or tenons 14a and 14b enable the inner ring 9 to be centered on the troughs 16a and 16b. The thickness of these webs 14a and 14b is determined in such a manner that the webs 14a and 14b transmit radial loading from the shaft 2 to the inner ring 9 providing the radial loading is of a magnitude less than a predetermined threshold Fm. When the radial loading transmitted by the shaft 2 becomes equal to or greater than Fm, then the webs or tenons 14a and 14b break, and the front portion 1 of the shaft 2 is released radially relative to the longitudinal axis X of the inner ring 9. In other words, the axis 11 of the shaft 2 becomes offset from the longitudinal axis X by a distance d that is no greater than the clearance J between the inside face 12 of the inner ring 9 and the outside face of the shaft 2, and as can be seen in FIG. 2. This can occur in the event of a large amount of unbalance occurring due to a blade of the fan breaking.

While the shaft 2 is moving radially relative to the inner ring 9, the balls 28a and 28b move apart the bottoms of their respective indentations 25 and 26, and they begin to roll without excessive friction against the walls of these indentations. The second trough 16b is then moved away from the first trough 16a and compresses the resilient spacers 20.

The axial force exerted by the resilient spacers 20 is compensated by the axial components of the forces exerted by the balls 28a and 28b against the walls of the indentations 25 and 26. The forces exerted by the balls 28a and 28b against the walls 25 and 26 have a radial resultant opposing the radial loading F on the shaft 2. This radial loading is a function of the unbalance and of the speed of rotation of the shaft. Once fuel ceases to be fed to the engine of the turbojet, the speed of the fan slows down to its windmilling speed, and the axial forces applied by the resilient spacers 20 tend to return the balls 28a and 28b towards the bottoms of their indentations 25 and 26.

FIG. 3A shows an indentation 25 of conical shape formed in a trough 16a or 16b, and FIG. 4A is a diagram plotting displacement d as a function of the radial force F exerted by the rotating shaft 2. So long as the webs or tenons 14a and 14b remain secured to the inner ring 9 and the force F remains below Fm, the displacement d is equal to zero, as represented by segment OA. Once the force F reaches or exceeds Fm, the webs or tenons 14a and 14b break and the shaft 2 is offset through a distance d which is usually less than J. When the value J is reached, the shaft 2 presses against the inside face 12 of the inner ring 9. The initial offset is represented by segment AB. As soon as the radial force decreases due to a reduction in the speed of rotation of the shaft 2, the distance d becomes proportional to the force F, as represented b segment BO.

FIG. 3B shows an indentation 25 in the form of two cones formed in a trough 16a or 16b. So long as the radial force F is less than Fm and the webs or tenons 14a and 14b are secured to the inner ring 9, the displacement d is zero. Once the radial force F becomes equal to Fm, the webs or tenons 14a and 14b break and the axis 11 of the shaft 2 is offset through a distance d from the longitudinal axis X. This displacement is represented by segment AB in FIG. 4B. The balls 28a and 28b are then positioned on the outer cone 31b of the indentation 25 and as the radial force F decreases, the balls move closer to the inner cone 31a. This is represented in FIG. 4B by segment BC. While the balls 28a and 28b are rolling on the wall of the inner cone 31a, the ratio between displacement d and the radial force F is represented by segment CO in FIG. 4B.

FIG. 3C shows an indentation 25 whose radius of curvature increases going away from the axis 30. This makes it possible to adjust the stiffness of the bearing 5 after the webs or tenons 14a and 14b have broken.

The indentation 26 associated with the indentation 25 is preferably identical to the indentation 25.

Reference 32 which is visible in FIGS. 1 and 2 shows a nozzle fed with oil by a duct 33 secured to the stationary structure of the turbojet and serving to lubricate the bearing 5. Because the bearing 5 does not move radially relative to the stationary structure, the nozzles 32 continue to provide proper lubrication of the bearing 5, after decoupling.

What is claimed is:

1. A device for radially supporting the front (1) of a drive shaft (2) for a fan (3) of a turbojet of longitudinal axis X, the axis (11) of said shaft (2) normally coinciding with said longitudinal axis X, the device comprising a stationary annular support (4) surrounding said shaft (2), a support bearing (5) disposed between said shaft (2) and said support (4) and presenting an outer ring (8) that is stationary in rotation and an inner ring (9) that moves in rotation with said shaft (2), fusible means interposed radially between one of said rings (8, 9) and the adjacent part of the assembly constituted by said shaft (2) and said support (4) and designed to break on the appearance of a radial load F of magnitude greater than a predetermined threshold Fm so as to release said shaft (2) radially relative to said support (4), and means for recentering the axis (11) of the shaft (2) on the longitudinal axis X of the turbojet after said fusible means have broken, the device being characterized by the fact that the radially fusible means comprise two sectorized annular webs or tenons (14a, 14b) provided in the respective radially outer regions of the inner ring (9) and extending axially outwards therefrom, the ends of said webs or tenons (14a, 14b) being normally retained in the peripheries of two annular troughs (16a, 16b) that are axially spaced apart and constrained to rotate with the shaft (2), the radially inside face (12) of the inner ring (9) being radially spaced apart from the shaft (2) so as to leave the shaft (2) with clearance in the event of said webs or tenons (14a, 14b) breaking, and by the fact that the means for recentering the axis (11) of the shaft (2) on the longitudinal axis X of said turbojet comprise two sets of balls (28a, 28b) each disposed between an axial face (24a, 24b) of the inner ring (9) and the adjacent trough (16a, 16b), each ball normally bearing against the bottoms of two facing indentations, one indentation (25) in the adjacent trough (16a, 16b) and the other indentation (26) in the adjacent front face (24a, 24b) of the inner ring (9), and resilient means (20) urging said trough (16a, 16b) towards each other in order to return the balls (28a, 28b) towards the bottoms of said indentations (25, 26).

2. A device according to claim 1, characterized by the fact that each indentation (25, 26) is circularly symmetrical about an axis (30) that is normally parallel to the longitudinal axis X.

3. A device according to claim 1 or claim 2, characterized by the fact that the resilient means (20) bear against the axially outer face of one of the troughs (16b), the other trough (16a) being axially stationary relative to the shaft (2).

* * * * *